Patented Dec. 9, 1924.

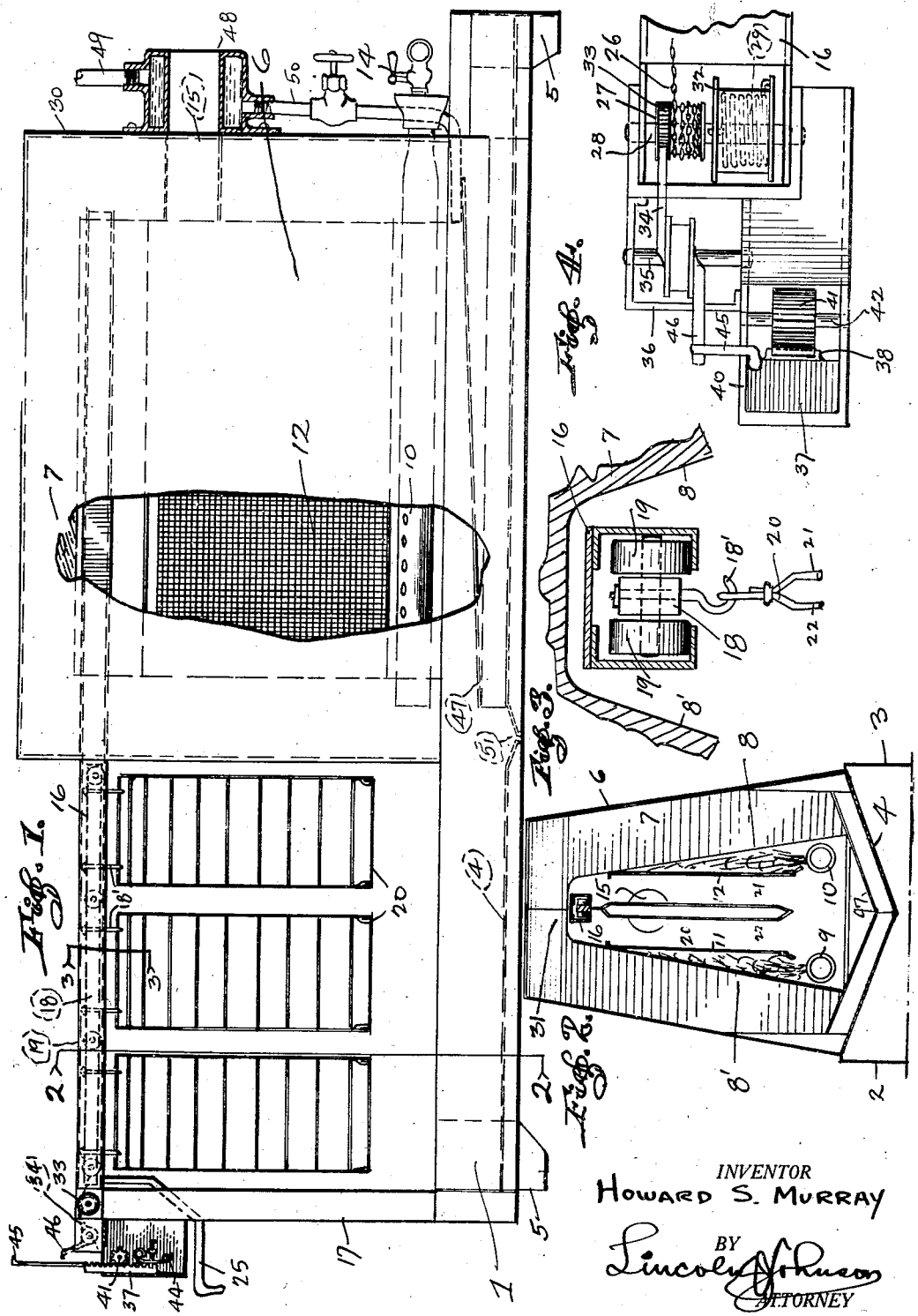

1,518,811

UNITED STATES PATENT OFFICE.

HOWARD SLATER MURRAY, OF LOS ANGELES, CALIFORNIA.

AUTOMATIC MEAT BROILER.

Application filed March 13, 1923. Serial No. 624,740.

*To all whom it may concern:*

Be it known that I, HOWARD SLATER MURRAY, a citizen of the United States, and a resident of the city and county of Los Angeles, State of California, have made a new and useful invention—to wit, Improvements in Automatic Meat Broilers; and I do hereby declare the following to be a full, clear, concise, and exact description of the same.

This invention relates particularly to a stove adapted perticularly for the broiling of meats.

An object of this invention is to provide a broiler wherein a slice of meat will be broiled by a radiated flame heat simultaneously on both its sides, and after a period of time automatically removed from the heating area. Other objects and advantages will appear as this description advances.

In this specification, and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings:

Fig. 1 represents a side elevation of a broiler constructed in accordance with my invention, partially broken away to show the interior construction thereof.

Fig. 2 is an end view of Fig. 1 taken on the line 2—2 of Fig. 1.

Fig. 3 is an enlarged section taken through Fig. 1 on the line 3—3.

Fig 4 is an enlarged plan view of the timing mechanism.

In detail, the construction illustrated in the drawings comprises a base member 1, preferably formed from sheet metal and consisting of parallel side walls 2 and 3, and upper wall 4 slanted from both sides downwardly toward the center for draining purposes. The base 1 is supported on suitable legs 5, leaving a space underneath for sanitary reasons.

A metal housing 6 is mounted on top of the upper wall 4 of the base 1, adjacent an end thereof, which said housing has its interior lined with a suitable fire brick 7, possessed of heat resisting and non-conducting properties. The sides 8 and 8', one end 30, top 31 and bottom 47 of the interior of the casing 6 are covered with the said fire brick, a suitable opening being cut through the open end of the casing to allow for the introduction and removal of objects to and from the interior of said casing. The fire proof walls 8 and 8' of the casing are arranged at an angle of about seven degrees from the vertical so that the upper edges slant to meet each other at 31, and to form a constricted passage.

A pair of gas burners 9 and 10 are arranged within the interior of the casing 6, each of said burners being arranged close to the inner face of the walls 8 and 8' near the bottom thereof. Screen, or other equivalent grid members 11 and 12 formed from metal capable of withstanding the destructive effects of flame and heat are placed within the interior of the casing 6 and supported therein away from the walls 8 and 8'. Thus the heat from the burners will have to pass between the fire prof walls and grids 11 and 12 prior to escaping outwardly through the said porous grids. This is accomplished by arranging the grids substantially in a vertical position, and at an angle, to the face of the slanted inner fire proof walls 8 and 8'. By regulating of the gas supply valve 14, gas passes from the burner orifices and is lighted. The flame and heat therefrom rises and heats the walls 8 and 8' and then escapes outwardly through the perforated grids 11 and 12 into the central chamber of the casing 6. The flame and heat that contacts with the grids heats the same to incandescence so that it radiates heat therefrom. Smoke and other fumes are allowed to pass out of the port 15 provided through the closed end 30 of the casing.

A channel guide way 16 is arranged within the restricted upper part of the casing 6 between the fire-proof walls thereof, and extends outwardly substantially even with the end of the base 1, to which it is suitably connected by the supporting bracket 17. A carrier member 18 is arranged within the channel guide way 16 and is carried on rollers 19 rolling on the channel guide 16 as a track. A plurality of hook members 18' project from the underside of the carrier 18, and to which a plurality of wire frames 20 are adapted to be removably secured and within which meat is adapted to be clamped and held. The meat carrying frames 20 consist of a pair of wire racks 21 and 22, pivotally connected to each other to the bottom, and spaced apart throughout the interior thereof and adapted to be detachably engaged to the upper ends thereof. This form of frame may be cheaply and easily constructed, and forms a simple and effective means for holding the meat in the broiling position desired. A handle 25 is provided, adjacent one end of the carrier 18 for the purpose of moving the carrier, with its meat frames 20 suspended thereon, into the casing 6, for the broiling operation.

A cable member 26 is secured at one end to the carrier 18, and at its opposite end is coiled around a drum 27 rotatably journaled on a shaft 28 mounted in the guideway 16. A spirally wound clock spring 29 is arranged around the shaft 28 in a drum 32 fixedly secured to the cable drum 27. One end of the spring 29 is fixed in the shaft 28, and the other end to the drum 32. Thus, when the carrier 18 is moved into the casing 6, the cable 26 unwinds as the drum 27 revolves, which action serves to rotate the drum 32 and to wind the spring 29. The spring 29 is kept in the wound condition by means of a ratchet wheel 33 on the cable drum 27, being engaged by a pawl 34. The pawl 34 will allow the drum 27 to move in the winding direction of the spring 29, but not in the opposite direction. The pawl 34 is fixedly mounted on a shaft 35, journaled in the housing 36.

A weight member 37, having a gear rack 38 on one face thereof, is slidably confined to movement in a vertical direction within the casing 40, mounted adjacent the end of the guide frame 16. The teeth of the rack 37, intermesh with a gear 41, rotatively mounted on a shaft 42, fixed in the casing 40. A spring finger 44 is arranged within the casing 40 having the free end in frictional contact with the rack 37 for the purpose of retarding dropping movement thereof. An extension member 45 projects from the upper end of the rack 37, and is adapted to engage a trip arm 46, secured to the pawl 34. Thus, movement of the carrier 18 into the casing 6, unwinds the cable from the drum 27 and winds the spring 29 at the same time which is held in the wound position by the pawl 34 engaging the ratchet 33 secured to the drum 27.

At the same time that the carrier 18 is moved into the casing 6, the weight 37 would be lifted to the upper-most end of its stroke, released, and allowed to drop. The gear 41 and finger spring 44 allows the weight to drop gradually, and as it nears the bottom of its stroke the projection 45 on said weight would engage the pawl arm 46, release the pawl 34 from the ratchet 33 allow the spring 29 to expand and rotate the drums 32 and 27, and to withdraw the carrier 18 from the casing.

Although one particular form of timing means has been shown, it is to be understood that any equivalent timer might be used in lieu thereof. The length of stroke of the weight 37 would regulate the period of time that the carrier 18 would stay within the casing 6, and the period of time is regulated by the degree of tension placed upon the spring member 44 to regulate the speed of drop of the weight 37.

I have discovered that the hot fumes passing out through the port 15 can be utilized to advantage by arranging a hollow water jacket 48 on the outside of the port 15 through the interior of which the said hot gases will pass prior to entering a suitable chimney not shown. A water supply conduit 49 would be secured to the water jacket 48. A conduit 50 would connect the water jacket 48 with the interior of the casing for passing a stream of heated water onto the said bottom for the two fold purpose of reducing the temperature of said bottom and cleansing and removing grease and other substances therefrom. The heated water is thus very effective for cleaning the trough bottom of the casing 6 and carrying débris out through the bottom drain 51.

This invention is operated in the following manner:

The frames 20 would be filled with slices of meat, and hung on the hooks 18' depending from the carrier 18. The carrier would then be moved on the guideway 16 into the casing 6, placing the meat frames 20 between the incandescent grids 11 and 12. Simultaneously, with the placing of the meat frames within the heating grids, the timer weight 37 would be elevated and allowed to drop, and the period of time taken by it to travel its full course would regulate and control the period of time that the meat would be subjected to broiling. As the timer weight nears the bottom of its stroke, the spring pawl 34 is tripped by engagement of the rack extension 45 and trip arm 46 allowing the spring 29 to be unwound, and the carrier 18 to be withdrawn from the casing 6.

Having thus described this invention, what I claim and desire to secure by Letters Patent is:—

1. A broiler comprising an open ended chamber formed of heat resisting material; spaced heating means within said chamber; a track within said chamber; a carrier on said track and means for removably positioning articles to be cooked on said carrier and within said chamber, between said heating means for a predetermined period of time.

2. A broiler comprising a chamber, formed of heat resisting material, open at the ends; spaced burners within said chamber; grids arranged within said chamber adjacent said burners and adapted to be heated to incandescence thereby; a carrier for holding articles to be cooked between said grids; and a spring actuated timer connected to said carrier to withdraw said carrier from between said grids after a predetermined period of time.

3. A broiler, including a chamber, formed of heat resisting material, open at the ends, and having inwardly inclined side walls; heating means adjacent each of said side walls within said chamber; a carrier for detachably suspending an article to be cooked within said chamber by the said heating means; and a spring actuated timer connected to said carrier for effecting removal of the carrier and cooked article from the said chamber after a predetermined period of time.

4. A broiler comprising a chamber, formed of heat resisting material, open at the ends, and having inwardly inclined side walls; burners within said chamber adjacent the bottom of each of said side walls; grids arranged in substantially a vertical position within said chamber, adjacent said burners and adapted to be heated to incandescence thereby; a carrier for detachably suspending an article to be cooked by said grids; and a spring actuated timer connected to said carrier for effecting removal of the carrier and cooked article after a predetermined period of time.

5. A meat broiler comprising a chamber formed of heat resisting material, open at the ends, and having inwardly inclined side walls; spaced burners within said chamber; grids arranged within said chamber adjacent to said burners and adapted to be heated to incandescence thereby; a track secured within the inner apex of said chamber; and a carrier mounted on said track; frames detachably mounted on said carrier for supporting an article to be cooked by the said grids; and a spring actuated timer connected to said carrier to withdraw said carrier after a predetermined period of time.

6. A meat broiler comprising a chamber formed of heat resisting material, open at the ends, and having inwardly inclined side walls; spaced burners within said chamber, grids arranged within said chamber adjacent to said burners and adapted to be heated to incandescence thereby; a track secured within the inner apex of said chamber; a carrier mounted on said track for supporting article to be cooked by the said grids and a spring actuated timer mechanism on said chamber for effecting removal of the cooked article from between said grids after a predetermined period of time.

In testimony whereof, I have hereunto set my hand at Los Angeles, California, this 11th day of December, 1922.

HOWARD SLATER MURRAY.

In the presence of—
L. F. JONES.